United States Patent [19]

Yanagisawa et al.

[11] 4,430,099

[45] Feb. 7, 1984

[54] VAPORIZED FUEL ADSORBING CANISTER

[75] Inventors: Syozo Yanagisawa, Ibaraki; Yuichi Tobita, Katsuta, both of Japan

[73] Assignee: Hitachi, Ltd., Tokyo, Japan

[21] Appl. No.: 274,678

[22] Filed: Jun. 17, 1981

[30] Foreign Application Priority Data

| | | | |
|---|---|---|---|
| Jun. 18, 1980 | [JP] | Japan | 55-83214 |
| Aug. 1, 1980 | [JP] | Japan | 55-108443[U] |
| Sep. 5, 1980 | [JP] | Japan | 55-122382 |
| Sep. 22, 1980 | [JP] | Japan | 55-133809[U] |

[51] Int. Cl.³ .............................................. B01D 50/00

[52] U.S. Cl. ........................................ 55/316; 55/387; 123/519

[58] Field of Search ................... 55/316, 387; 123/519

[56] References Cited

U.S. PATENT DOCUMENTS

| | | | |
|---|---|---|---|
| 3,683,597 | 8/1972 | Beveridge et al. | 123/519 |
| 4,173,207 | 11/1979 | Hiramatsu | 123/519 |
| 4,279,233 | 7/1981 | Tobita et al. | 123/519 |
| 4,306,894 | 12/1981 | Fukami et al. | 55/316 |
| 4,308,840 | 1/1982 | Hiramatsu et al. | 55/387 |
| 4,331,120 | 5/1982 | Hiramata et al. | 123/520 |

FOREIGN PATENT DOCUMENTS

| | | | |
|---|---|---|---|
| 55-60650 | 5/1980 | Japan | 123/519 |
| 1434250 | 5/1976 | United Kingdom | 123/519 |

*Primary Examiner*—Bernard Nozick
*Attorney, Agent, or Firm*—Antonelli, Terry & Wands

[57] ABSTRACT

A vaporized fuel adsorbing canister constituting a vaporized fuel adsorbing system of an internal combustion engine including a hollow body filled with a charge of vaporized fuel adsorbing agent for collecting a vaporized fuel thereon and having two filter members each mounted at one of opposite ends thereof and supported by a grid. A porous material member formed with at least more than one vaporized fuel permeating opening for collecting oil and fat thereon is located between one of the grids and a vaporized fuel inlet port, so that liquefied fuel introduced through the vaporized fuel inlet port into the hollow body can be led to the porous material member and the oil and fat that might be incorporated in the liquefied fuel can be collected on the porous material member.

17 Claims, 11 Drawing Figures

VAPORIZED FUEL ADSORBING CANISTER

BACKGROUND OF THE INVENTION (1) Field of the Invention

This invention relates to a canister constituting a vaporized fuel adsorbing system used with an internal combustion engine.

(2) Background of the Invention

A vaporized fuel adsorbing system is one in which vaporized fuel produced in the fuel tank for storing fuel for use in the internal combustion engine is collected on the vaporized fuel adsorbing material, such as activated charcoal, contained in the vaporized fuel adsorbing canister (hereinafter canister, for short), and the vaporized fuel collected on the activated charcoal is drawn by suction into the engine for combustion during engine operation.

The canister comprises a hollow body containing charge of activated charcoal, and a cover attached to the hollow body and formed with a vaporized fuel inlet and a vaporized fuel outlet for introducing the vaporized fuel into the hollow body to be collected on the activated charcoal and for discharging the vaporized fuel from the hollow body respectively. The hollow body is provided at either end thereof with a filter member compactly supporting the activated charcoal and preventing incorporation of dust in the vaporized fuel.

The cover of the canister is fluidly connected to the fuel tank through a rubber tube to allow the vaporized fuel produced in the fuel tank to flow therethrough into the cover. During the process of introduction of the vaporized fuel into the cover, the phenomenon of the vaporized fuel changing into a liquid might occur. The liquefield fuel is high in solubility and tends to dissolve oil, such as a mold releasing agent for the rubber tube and grease for a check valve mounted midway in the rubber tube, so that the liquefied fuel containing the dissolved oil and fat flows along the inner wall surface of the cover into the filter member interposed between the cover and the activated charcoal.

The filter member used is of a fine mesh type (10-80 mesh) formed of unwoven cloth or foamed urethane. Thus the oil and fat, such as the mold releasing agent and grease, incorporated in the liquefied fuel would be gradually accumulated on the filter member, until finally they would obturate the filter member.

Obturation of the filter member raises the serious problem that obstruction of the passage of the vaporized fuel through the filter member prevents the vaporized fuel from being collected on the activated charcoal in the hollow body of the canister.

SUMMARY OF THE INVENTION

This invention has been developed for the purpose of obviating the aforesaid disadvantages of the prior art. Accordingly the invention has as its object the provision of a canister wherein the filter member interposed between the cover and the vaporized fuel adsorbing agent is kept from being obturated with oil and fat, such as a mold releasing agent, grease, etc.

The outstanding characteristic of the invention is that a porous material member having an oil and fat adsorbing function formed with at least one vaporized fuel permeating opening for allowing vaporized fuel to pass therethrough is located between a filter member interposed between the cover and the vaporized fuel adsorbing agent and the vaporized fuel inlet port formed in the cover, with the liquefied fuel flowing through the vaporized fuel inlet port being led to the porous material member.

DESCRIPTION OF THE PREFERRED EMBODIMENTS

Figure 1:
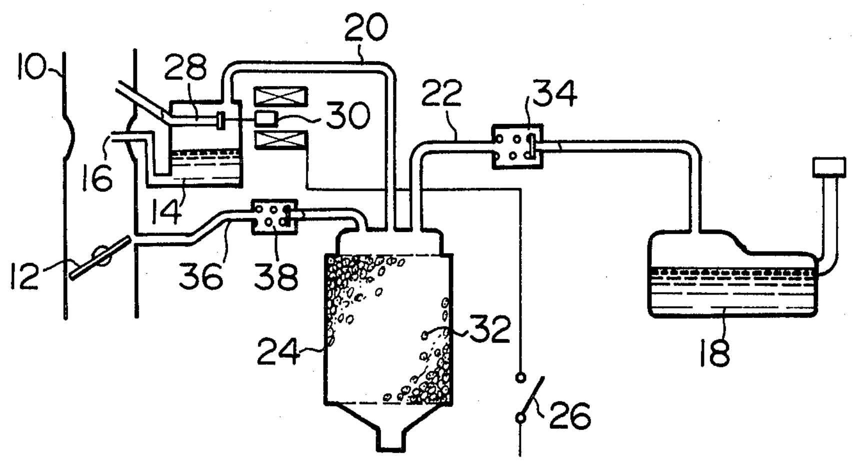
FIG. 1 is a diagrammatic view of a vaporized fuel adsorbing system.

The invention will now be described in detail by referring to its embodiments shown in the drawings. FIG. 1 shows the construction of a vaporized fuel adsorbing system used with an internal combustion engine provided with a carburetor. The numeral 10 designates a suction conduit receiving a supply of fuel through a nozzle 16 from a float chamber 14 in accordance with the opening of a throttle valve 12. The float chamber 14 receives a supply of fuel from a fuel tank 18 by a fuel pump, not shown. Meanwhile an upper portion of the float chamber 14 and an upper portion of the fuel tank 18 are connected to a canister 24 via rubber tubes 20 and 22 respectively. Upon a key switch 26 being brought to an open position during engine shutdown, an air vent 28 opening in the float chamber 14 is closed by an electromagnetic valve 30 and the vaporized fuel produced in the float chamber 14 is led via the rubber tube 20 to the canister 24 where it is collected on a charge of vaporized fuel adsorbing agent, such as activated charcoal 32. The vaporized fuel produced in the fuel tank 18 is introduced into the canister 24 through the rubber tube 22 by opening a check valve 34, to be collected on the activated charcoal 32. During engine operation, a subatmospheric pressure is produced in the vicinity of the throttle valve 12 and opens a check valve 38 mounted midway in a rubber tube 36 connecting an upper portion of the canister 24 to the suction conduit 10, so that the vaporized fuel collected on the activated charcoal 32 is released therefrom and supplied to the engine through the suction conduit 10. In the embodiment shown, the vaporized fuel produced in the float chamber 14 of the carburetor is introduced into the canister 24 to be collected on the activated charcoal 32 because of the use of the carburetor with the internal combustion engine.

However, when the engine is provided with a fuel injection system, the vaporized fuel from the fuel tank 18 alone has to be led to the canister 24 to be collected on the activated charcoal 32, because the fuel injection system is not provided with a float chamber.

The vaporized fuel adsorbing system of the aforesaid construction has, as described in the Background of the Invention, the problem that the vaporized fuel liquefied in the rubber tube 22 dissolves a mold releasing agent for the rubber tube 22 and grease in the check valve before flowing into the canister 24, thereby obturating the filter members therein. The vaporized fuel adsorbing system according to the invention is capable of avoiding the obturation of the filter members with the mold releasing agent and grease. Preferred embodiments of the invention will now be described.

Figure 3:
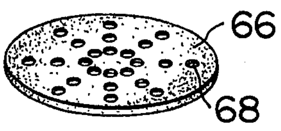
FIG. 3 is a perspective view of the porous material member.
Figure 2:
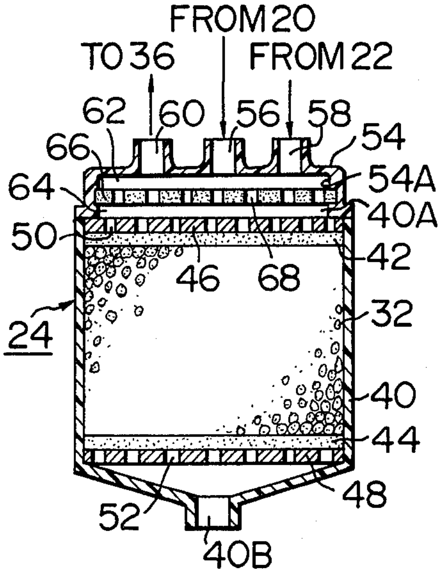
FIG. 2 is a vertical sectional view of the vaporized fuel adsorbing canister comprising one embodiment of the invention.

FIG. 2 shows one embodiment wherein a first filter member 42 is located at one end of a hollow body 40 formed with a first opening 40A and a second opening 40B and a second filter member 44 is located at the other end of the hollow body 40, and the activated charcoal 32 is packed in the hollow body 40 between the two filter members 42 and 44 formed of nonwoven cloth, foamed urethane, etc. In order to hold the activated charcoal 32 in a compactly packed condition, a first grid 46 and a second grid 48 formed of metal are arranged adjacent the filter members 42 and 44 on a side thereof opposite the activated charcoal 32 respectively. The first grid 46 is formed with a multiplicity of vaporized fuel permeating openings 50 for allowing the vaporized fuel to pass therethrough, while the second grid 48 is formed with a multiplicity of air permeating openings 52 for allowing purging air to pass therethrough. A cover 54 is attached to an end of the hollow body 40 at which the first opening 40A is formed and the first filter member 42 and the first grid 46 are mounted, to close the first opening 40A. The cover 54 is formed with vaporized fuel inlet ports 56 and 58 connected to the rubber tubes 20 and 22 respectively and with a vaporized fuel outlet port 60 connected to the rubber tube 36. The vaporized fuel inlet port 56 may be dispensed with when the system is used with an internal combustion engine provided with a fuel injection system. A porous material member 66 formed of nonwoven cloth for adsorbing oil and fat is fitted in the cover 54 in a position between the vaporized fuel inlet ports 56 and 58 and the first grid 46 to define spaces 62 and 64 in the cover 54. The porous material member 66 is maintained in contact with an inner wall surface 54A of the cover 54 for adsorbing the fuel containing oil and fat flowing along the inner wall surface 54A of the cover 54, so that the inner wall surface 54A will serve as the path of flow of the liquefied fuel. As shown in FIG. 3, the porous material member 66 is formed with a multiplicity of vaporized fuel permeating openings 68 for allowing vaporized fuel to pass therethrough. The number and size of the vaporized fuel permeating openings 68 are selected such that the total vaporized fuel permeating area of the member 66 is enough to allow sufficient ventilation to be maintained through the porous material member 66 even if the member 66 is obturated with oil and fat. The porous material member 66 has a density which is equal to or higher than that of the first filter member 42. However, the invention is not limited to this arrangement, so long as oil and fat can be collected on the porous material member 66 even if the density of the member 66 is lower than that of the first filter member 42 (or the pores are larger in size).

In addition to unwoven cloth, paper, foamed urethane, etc., may also be used for forming the porous material member 66.

The reason why the space 62 is provided is because the presence of the space 62 enables the vaporized fuel to come into contact with the entire surface of the porous material member 66, and the space 64 is intended to prevent the vaporized fuel permeating openings 68 of the porous material member 66 from being closed by the first grid 46 when the member 66 contacts the first grid 46.

In the aforesaid constructon, when the vaporized fuel produced in the fuel tank 18 and float chamber 14 is changed into a liquid state as it flows through the rubber tubes 20 and 22, the liquefied fuel might dissolve the mold releasing agent of the rubber tubes 20 and 22 and the grease in the check valve 34 before flowing into the vaporized fuel inlet ports 56 and 58 of the canister 24. The liquefied fuel containing oil and fat flows along the inner wall surface 54A of the cover 54 to be adsorbed on the porous material member 66. The porous material member 66 allows the liquefied fuel itself to pass therethrough but does not allow the oil and fat to pass therethrough, so that they are collected on the member 66. Thus the liquefied fuel itself flows through the space 64, vaporized fuel permeating openings 50 of the first grid 46 and first filter member 42 to be collected on the activated charcoal 32. It goes without saying that the vaporized fuel passes through the vaporized fuel permeating openings 68 of the porous material member 66, vaporized fuel permeating openings 50 of the first grid 46 and first filter member 42 to be collected on the activated charcoal 32.

When the vaporized fuel collected on the activated charcoal 32 is desired to be released therefrom, the air introduced through the second filter member 44 is passed through the charge of activated charcoal 32 to cause the vaporized fuel to be released from the activated charcoal 32 and passed through the first filter member 42, vaporized fuel permeating openings 50 of the first grid 46 and vaporized fuel permeating openings 68 of the porous material member 66 to be discharged from the canister 24 through the vaporized fuel outlet port 60 and supplied to the engine.

The first filter member 42 is prevented from being obturated with oil and fat due to the oil and fat adsorbing function of the porous material member 66. This allows clean vaporized fuel to be collected on the activated charcoal 32 at all times through the first filter member 42, thereby solving the serious problem encountered by the vaporized fuel adsorbing system of the prior art that no vaporized fuel is collected on the activated charcoal 32. The porous material member 66 is designed to be able to collect oil and fat in amounts such that it is still capable of collecting oil and fat when the total amounts of oil and fat flowing into the cover 54 have been collected thereby.

Figure 4:
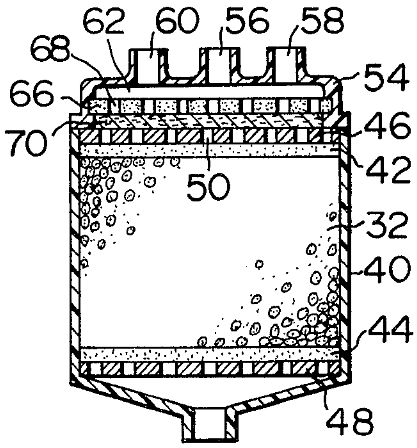
FIGS. 4 and 5 are vertical sectional views of vaporized fuel adsorbing canisters representing modifications of the embodiment shown in FIG. 2.

Modifications of the embodiment shown in FIG. 2 will be described by referring to FIGS. 4 and 5. FIG. 4 shows a first embodiment in which a porous support member 70 for supporting the porous material member 66 is fitted in the space 64 defined between the porous material member 66 and first grid 46. The porous support member 70 is formed of glass wool and formed with larger pores than the porous material member 66. The function of the porous support member 70 is to keep the porous material member 66 in flat condition when the porous material member 66 is unable to keep itself flat by itself. When the porous material member 66 itself has rigidity as shown in FIG. 2, the support member 70 may be dispensed with.

Figure 5:
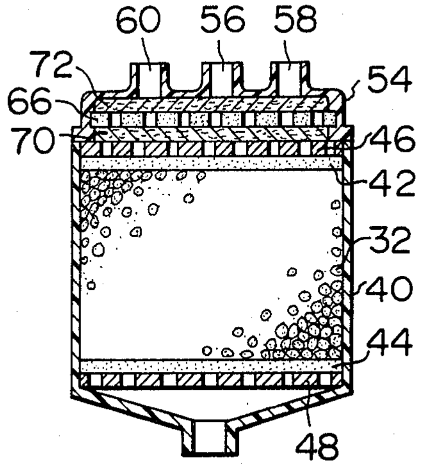

FIG. 5 shows a second modification including, in addition to the construction of the first modification, shown in FIG. 4, a liquefied fuel diffusing porous member 72 located in the space 62 defined between the vaporized fuel inlet ports 56 and 58 and the vaporized fuel outlet port 60 in the cover 54 and the porous material member 66. The liquefied fuel diffusing porous member 72 is formed of glass wool and has larger pores than the porous material member 66. The function of the liquefied fuel diffusing porous member 72 is to prevent the liquefied fuel flowing through the vaporized fuel inlet ports 56 and 58 from flowing along the inner wall surface 54A of the cover 54 alone, to thereby cause the liquefied fuel to come into contact with the entire surface of the porous material member 66. This function can be explained by the well known capillary action.

Figure 6:
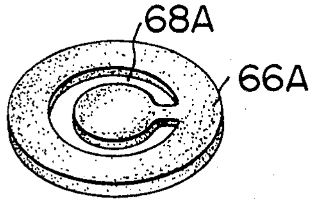
FIG. 6 is a perspective view of a modification of the porous material member shown in FIG. 3.

FIG. 6 shows a modification of the porous material member in which the configuration of the member is somewhat varied. As shown, the porous material member 66A is formed with a single ventilating opening 68A of substantially the same area as the total area of the vaporized fuel permeating openings 68 of the porous material member 66 shown in FIG. 3. It will be appreciated in FIGS. 3 and 6 that the vaporized fuel permeating openings essentially need be more than one in number.

Figure 7:
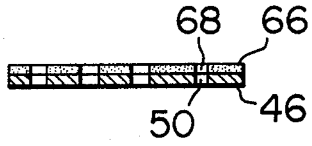
FIG. 7 is a vertical sectional view of an example in which the porous material member and the grid are formed into a unitary structure.
Figure 8:
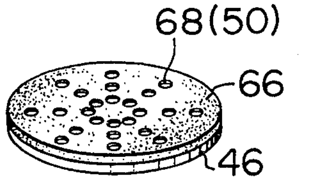
FIG. 8 is a perspective view of the unitary structure shown in FIG. 7.

FIGS. 7 and 8 show the porous material member 66 and the first grid 46 being formed into a unitary structure. The porous material member 66 is adhesively connected to the first grid 46 in such a manner that the vaporized fuel permeating openings 68 of the porous material member 66 are in coincidence with the vaporized fuel permeating openings 50 of the first grid 46. The assembly of porous material member 66 and first grid 46 is produced by first adhesively connecting them together and then punching them with a press.

Figure 9:
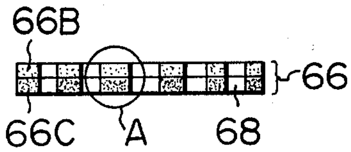
FIG. 9 is a vertical sectional view of the porous material member having a dual structure.
Figure 10:
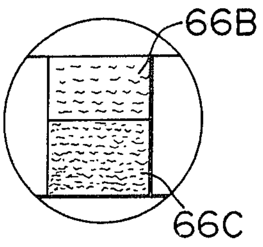
FIG. 10 is a view, on an enlarged scale, of the portion A shown in FIG. 9.

FIGS. 9 and 10 show a modification of the porous material member in which the construction of the member is somewhat varied. The porous material members shown in FIGS. 3, 6 and 7 are all formed of material of the same density. However, the porous material member shown in FIG. 9 is characterized by having a double layer structure. In the case of a porous material member of material of the same density, a paucity of the area for adsorbing oil and fat makes it necessary to increase its thickness. The construction shown in FIG. 9 is advantageous in decreasing the thickness of the porous material layer. In FIG. 9, the porous material member assembly 66 includes a member 66B of lower density having larger pores than the porous material member 66 shown in FIGS. 3, 6 and 7, and a member 66C similar to the member 66 shown in FIGS. 3, 6 and 7, which are formed unitarily with the member 66B being disposed on the side of the vaporized fuel inlet ports 56 and 58. As shown in FIG. 10, the oil and fat pass through the member 66B to be collected on the member 66C, and when the member 66C is obturated the member 66B collects the oil and fat thereon. The member 66B is capable of adsorbing the oil and fat in greater amounts than the member 66C because of lower density, thereby enabling the thickness of the porous material member assembly 66 to be reduced.

Figure 11:
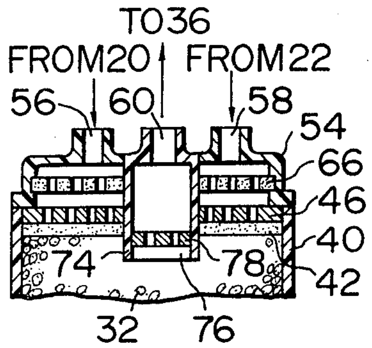
FIG. 11 is fragmentary vertical sectional view of the vaporized fuel adsorbing canister comprising another embodiment of the invention which is of type different from the canister shown in FIG. 2.

FIG. 11 shows canister of a type distinct from that of the canister shown in FIG. 2, in which the invention is incorporated. As shown, the vaporized fuel outlet port 60 communicates with a pocket 74 extending through the porous material member 66, first grid 46 and first filter member 42 into the activated charcoal 32. A filter 76 and a grid 78 are mounted in the pocket 74. Vaporized fuel is introduced through the vaporized fuel inlet ports 56 and 58 into the canister 24 in which it is collected on the activated charcoal 32, in the same manner as described by referring to FIG. 2, and the vaporized fuel collected on the activated charcoal 32 is discharged through the vaporized fuel outlet port 60 after passing through the filter 76, grid 78 and pocket 74. In this embodiment, the porous material member 66 has the same function and achieves the same effects as described by referring to the embodiment shown in FIG. 2.

From the foregoing description, it will be appreciated that the provision of a porous material member for adsorbing the oil and fat that might be incorporated in the liquefied fuel eliminates the disadvantage of the prior art that the filter member is obturated, thereby allowing the vaporized fuel to be collected on the vaporized fuel adsorbing agent without fail.

What is claimed is:

1. A vaporized fuel adsorbing canister, adapted to arrest oil or fat material contained in the fuel, comprising:

(a) a hollow body formed with a first opening at one end and a second opening at the other end;

(b) a first filter member mounted in said first opening and a second filter member mounted in said second opening;

(c) a charge of vaporized fuel adsorbing agent contained in said hollow body in a space defined between said first filter member and said second filter member;

(d) a first grid formed with a multiplicity of vaporized fuel permeating openings located adjacent said first filter member on a side thereof opposite said charge of vaporized fuel adsorbing agent and a second grid formed with a multiplicity of air permeating openings located adjacent said second filter member on a side thereof opposite said charge of vaporized fuel adsorbing agent;

(e) a cover affixed to said hollow body in closing relation to said first opening to provide a cover to said first filter member and said first grid;

(f) a vaporized fuel inlet port opening in said cover and adapted to communicate via a rubber tube with a portion of a fuel tank above its liquid level;

(g) a vaporized fuel outlet port opening in said cover and adapted to communicate via a rubber tube with a suction conduit of an engine; and (g) a porous material member mounted between said first grid and said vaporized fuel inlet port, said porous material member being formed of a porous material that can arrest an oil or fat material contained in the fuel introduced into the canister, said porous material member being formed with, in addition to the pores of the porous material, more than one vaporized fuel permeating opening to which is led a fuel lowing along an inner wall surface of said cover, each said more than one vaporized fuel permeating opening having an extent such that a hole is formed through the porous material member.

2. A vaporized fuel adsorbing canister as claimed in claim 1, wherein said porous material member is formed of material selected from the group consisting of unwoven cloth, paper and foamed urethane.

3. A vaporized fuel adsorbing canister as claimed in claim 1, wherein said porous material member and said first grid are adhesively bonded to each other into a unitary structure in such a manner that the vaporized fuel permeating openings thereof are in communication with one another.

4. A vaporized fuel adsorbing canister as claimed in claim 1, further comprising a second vaporized fuel inlet port opening in said cover and adapted to communicate via a rubber tube to a portion of a float chamber above its liquid level.

5. A vaporized fuel adsorbing canister as claimed in claim 1, wherein said charge of vaporized fuel adsorbing agent is made of activated charcoal.

6. A vaporized fuel adsorbing canister as claimed in claim 1, wherein said porous material member is made of a material that can arrest the oil or fat material by adsorbing said oil or fat material, whereby said porous material member permits said vaporized fuel to pass therethrough toward said first filter member while arresting flow of said oil or fat material to said first filter member, thereby substantially preventing obturation of the first filter member by said oil or fat material.

7. A vaporized fuel adsorbing canister as claimed in claim 1, wherein said more than one vaporized fuel permeating opening has a sufficient area such that the vaporized fuel can still pass through the more than one opening even when the porous material of the porous material member is obturated by said oil or fat material.

8. A vaporized fuel adsorbing canister as claimed in claim 1, further comprising a pocket means in communication with said vaporized fuel outlet port opening, said pocket means extending from said vaporized fuel outlet port opening into said charge of vaporized fuel adsorbing agent, and a filter and grid mounted in said pocket means.

9. A vaporized fuel adsorbing canister as claimed in claim 1, wherein said porous material member is substantially equal to or higher than said first filter member in density.

10. A vaporized fuel adsorbing canister as claimed in claim 9, wherein said porous material member has different densities on different sides thereof, the first density of one side thereof facing said first grid being equal to or higher than the density of said first filter member and the second density of the other side thereof facing said vaporized fuel inlet ports being lower than the first density.

11. A vaporized fuel adsorbing canister as claimed in claim 9, wherein said porous material member is maintained in contact with said cover, to enable the fuel flowing along the inner wall surface of said cover to be let to the porous material member.

12. A vaporized fuel adsorbing canister as claimed in claim 11, wherein said porous material member and said vaporized fuel inlet port define therebetween a first space, and said porous material member and said first grid define therebetween a second space.

13. A vaporized fuel adsorbing canister as claimed in claim 12, further comprising a liquid fuel diffusing porous member located in said first space, said liquid fuel diffusing porous member having larger bores than said porous material member.

14. A vaporized fuel adsorbing canister as claimed in claim 13, wherein said liquid fuel diffusing porous member is formed of glass wool.

15. A vaporized fuel adsorbing canister as claimed in claim 12, further comprising a support member located in said second space, said support member being formed of porous material having larger pores than said porous material member.

16. A vaporized fuel adsorbing canister as claimed in claim 15, wherein said support member is formed of glass wool.

17. A vaporized fuel adsorbing canister, adapted to arrest oil or fat material contained in the fuel, comprising:

(a) a hollow body formed with a first opening at one end and a second opening at the other end;
(d) a first filter member mounted in said first opening and a second filter member mounted in said second opening;
(c) a charge of vaporized fuel adsorbing agent contained in said hollow body in a space defined between said first filter member and said second filter member;
(d) a first grid formed with a multiplicity of vaporized fuel permeating openings located adjacent said first filter member on a side thereof opposite said charge of vaporized fuel adsorbing agent and a second grid formed with a multiplicity of air permeating openings located adjacent said second filter member on a side thereof opposite said charge of vaporized fuel adsorbing agent;
(e) a cover affixed to said hollow body in closing relation to said first opening to provide a cover to said first filter member and said first grid;
(f) a vaporized fuel inlet port opening in said cover and adapted to communicate via a rubber tube with a portion of a fuel tank above its liquid level;
(g) a vaporized fuel outlet port opening in said cover and adapted to communicate via a rubber tube with a suction conduit of an engine; and
(g) a porous material member mounted between said first grid and said vaporized fuel inlet port, said porous material member being formed of a porous material that can arrest an oil or fat material contained in the fuel introduced into the canister, said porous material member being formed with, in addition to the porous of said porous material, a single extended ventilating opening to which is led a fuel flowing along an inner wall surface of said cover, said single extended ventilating opening having an extent such that a hole is formed through the porous material member.

* * * * *